Figure 1:
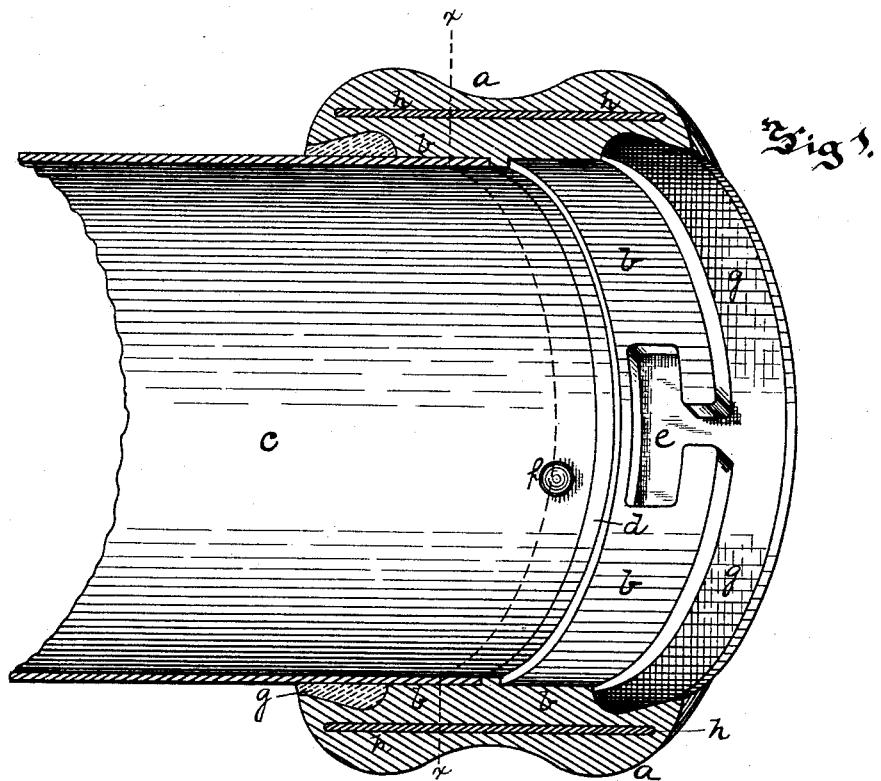

(No Model.)

E. C. CONVERSE.
JOINT FOR GAS MAINS.

No. 348,951. Patented Sept. 14, 1886.

Witnesses:
P. G. Kay
J. N. Cooke

Inventor.
Edmund C Converse
By James F. Kay
Attorney

UNITED STATES PATENT OFFICE.

EDMUND C. CONVERSE, OF PITTSBURG, PENNSYLVANIA.

JOINT FOR GAS-MAINS.

SPECIFICATION forming part of Letters Patent No. 348,951, dated September 14, 1886.

Application filed February 16, 1886. Serial No. 192,066. (No model.)

*To all whom it may concern:*

Be it known that I, EDMUND C. CONVERSE, of Pittsburg, in the county of Allegheny and State of Pennsylvania, have invented a new and useful Improvement in Joints for Gas-Mains; and I do hereby declare the following to be a full, clear, and exact description thereof.

My invention relates to the joints employed in connection with sections of pipe or tubing in the mains or conduits for natural gas or similar gaseous material. This gas is exceedingly thin and subtle, and great difficulty has been experienced in providing perfect joints for the sections of tubing forming the mains or conduits through which it passes, as it is liable to leak between the threads of the ordinary threaded tubing, and it has been practically demonstrated that the ordinary joints formed by threaded sockets cannot always be made sufficiently tight for holding this gas in large mains or pipes.

After large experience in the laying of these gas-mains it has been found that the lock-joint couplings for tubing such as are shown in Letters Patent No. 263,863, granted to me September 5, 1882, and similar couplings patented by me, in which the pipe is held from longitudinal strain and means are provided for calking the joint and forming a tight joint after the pipe is laid, give better results for large pipe or tubing than any other construction of joint heretofore employed, and also have the further advantage that as the pipe is not weakened by threading a lighter and cheaper pipe may be employed. Considerable difficulty has, however, been experienced with these joints when employed on high-pressure gas-mains near the gas-wells, on account of the porosity of the iron of which these sleeves have been made, this not being the fault of the construction of the joint, but of the metals of which it is formed. It has been found that under very heavy pressure the natural gas will leak through the pores of the cast metal, and even though the cast-metal sleeve does in most cases form a tight joint at a moderately high pressure, yet at a very high pressure—such as from one hundred and fifty to two hundred pounds—the leakage, when it occurs, is perceptible when the hand is placed close thereto, and therefore the ordinary cast-metal coupling-collar is not quite perfect for mains carrying this gas under heavy pressure. For this reason it is desirable to obtain a perfect joint of this character, in which there is no liability of the gas leaking through the pores of the metal.

My invention consists, essentially, in a cast-metal coupling sleeve or collar provided with suitable means for engaging with the tube-sections, and having inclosed within the metal of the same a wrought-metal shell forming a wall of dense material within the sleeve, which will not permit the escape of gas under any pressure.

To enable others skilled in the art to make and use my invention, I will describe the same more fully, referring to the accompanying drawings, in which—

Figure 2:
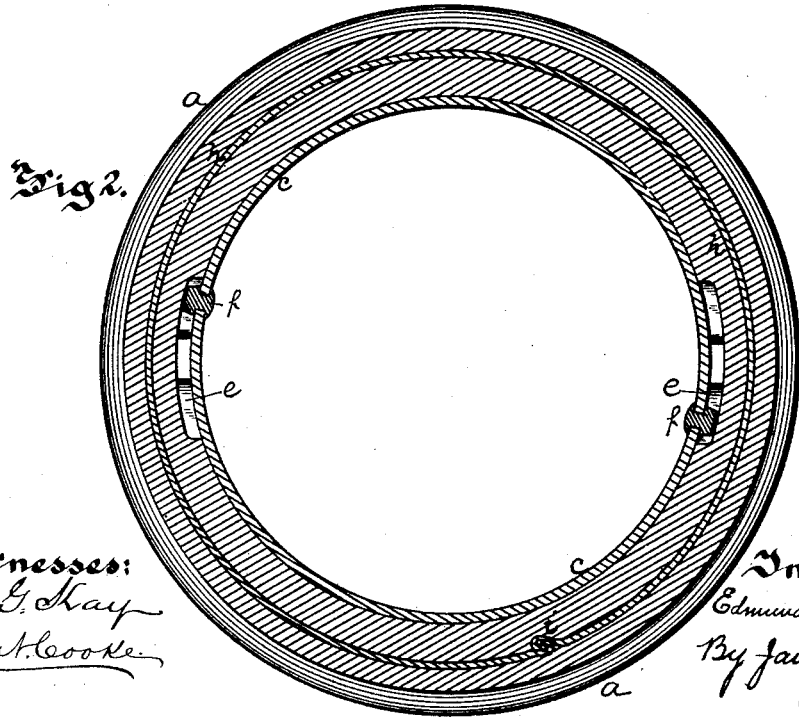

Figure 1 is a sectional perspective view illustrating my invention; and Fig. 2 is a cross-section on line $x\ x$, Fig. 1.

Like letters of reference indicate like parts in each.

My improved coupling is cast to shape, the wrought-metal shell or sleeve within the same being supported within the mold, and the molten metal flowing around and inclosing the same and filling the mold. In the form of coupling-sleeve shown the sleeve or collar $a$ has the inner face or faces, $b$, corresponding in shape and diameter to the outer shape and diameter of the tube-sections, $c$, to be connected, a central ring, $d$, against which the ends of the tube-sections bear, being preferably employed. Suitable locking-recesses, $e$, or other devices for engaging with the tube-sections, are preferably employed, in the form shown, the lugs or rivets $f$ on the tube-sections entering these locking-recesses $e$ and holding the tube-sections from longitudinal strain. At the ends of the sleeve, beyond the locking-recesses, are the calking-recesses $g$, of suitable form to receive the lead or other calking material, which, when properly packed within these recessses and around the body of the tubing, forms an efficient gas-tight join, and so preventing the escape of gas or other fluid. The wrought-metal shell or sleeve $h$ is formed of sheet or thin plate metal, and is bent to shape, its meeting edges being either lapped, as shown at *i*, or welded, a short section of metal tubing being suitable for the purpose. When the coupling-sleeve is cast, the molten metal will flow around this wrought-metal sleeve and fuse and unite with the surface thereof, forming a permanent union therewith. The wrought-metal sleeve extends out close to the ends of the coupling-sleeve, and so forms a wall of dense material within the body of the coupling, through which the gas cannot pass, even when under exceedingly heavy pressure.

When my improved coupling collar or sleeve is in use, the tube-sections are inserted therein and engage therewith by means of the lugs *f*, entering the locking-recesses *e*, or by other suitable means, and where lead joints are employed, as shown, the calking material is then poured within the calking-recesess *g* and packed or calked, thus completing the joint. Though the gas in passing through the main may leak through the pores of the cast-metal portion of the coupling-collar when under exceedingly heavy pressure, yet it is evident that it will come in contact with the wrought-metal shell or sleeve *h*, inclosed within the coupling, and that this shell is of such close and fine texture that all escape of gas through the same is precluded, a practically perfect joint, through which there is no possibility of gas-leakage, being thus obtained by the employment of this wrought-metal shell inclosed within the coupling-collar, and therefore the only objection to my patented coupling-collar for high-pressure gas and air, before referred to, is entirely overcome.

What I claim as my invention, and desire to secure by Letters Patent, is—

In joints for gas and similar mains, a cast-metal coupling sleeve or collar provided with suitable means for engaging with the tube-sections, and having inclosed within the metal of the same a wrought-metal shell, substantially as and for the purposes set forth.

In testimony whereof I, the said EDMUND C. CONVERSE, have hereunto set my hand.

EDMUND C. CONVERSE.

Witnesses:
HOWARD MACRUM,
W. C. SOLES.